United States Patent
Schell et al.

(10) Patent No.: US 9,995,649 B2
(45) Date of Patent: Jun. 12, 2018

(54) DUAL PURPOSE OPTICAL TEST INSTRUMENT

(71) Applicant: Fluke Corporation, Everett, WA (US)

(72) Inventors: J. David Schell, Austin, TX (US); Richard G. Tyler, Campton, NH (US)

(73) Assignee: FLUKE CORPORATION, Everett, WA (US)

( * ) Notice: Subject to any disclaimer, the term of this patent is extended or adjusted under 35 U.S.C. 154(b) by 0 days. days.

(21) Appl. No.: 15/146,765

(22) Filed: May 4, 2016

(65) Prior Publication Data

US 2017/0322111 A1    Nov. 9, 2017

(51) Int. Cl.
| | |
|---|---|
| *G01N 21/00* | (2006.01) |
| *G01M 11/00* | (2006.01) |
| *G02B 6/38* | (2006.01) |
| *H04B 10/07* | (2013.01) |

(52) U.S. Cl.
CPC ........ *G01M 11/3145* (2013.01); *G01M 11/33* (2013.01); *G02B 6/385* (2013.01); *H04B 10/07* (2013.01)

(58) Field of Classification Search
CPC ........... G01M 11/3145; G01M 11/335; G01M 11/33; G01M 11/3109; G01M 11/338
USPC ....................................................... 356/73.1
See application file for complete search history.

(56) References Cited

U.S. PATENT DOCUMENTS

| | | | | |
|---|---|---|---|---|
| 5,825,516 | A * | 10/1998 | Walsh ................... | G01M 11/33 356/73.1 |
| 8,908,167 | B2 | 12/2014 | Flora et al. | |
| 2004/0108446 | A1* | 6/2004 | Hildebrandt ......... | G02B 6/4201 250/227.14 |
| 2005/0206889 | A1* | 9/2005 | Koudelka .......... | G01B 11/2441 356/239.2 |
| 2013/0038864 | A1* | 2/2013 | Flora ................. | G02B 21/0016 356/73.1 |
| 2014/0124140 | A1* | 5/2014 | Verheyden .......... | G02B 6/3833 156/350 |
| 2015/0002564 | A1* | 1/2015 | Sugimoto ............ | G09G 3/2014 345/698 |
| 2015/0009320 | A1* | 1/2015 | Klein ................... | G01N 21/958 348/128 |

* cited by examiner

*Primary Examiner* — Tarifur Chowdhury
*Assistant Examiner* — Md M Rahman
(74) *Attorney, Agent, or Firm* — Seed Intellectual Property Law Group LLP

(57) ABSTRACT

One or more embodiments are directed to optical test instruments, such as fiber optic inspection scopes and optical power meters, for testing optical communication links, such as fiber optic connectors. The optical test instruments include a single test port that is able to operate in two modes of operation. In a first mode of operation, the optical test instrument is configured to provide an image of the endface of a fiber optic connector under test. In a second mode of operation, the optical test instrument is configured to measure power or power loss in an optical fiber under test. In that regard, the fiber optic connector only has to be coupled to a single port of an optical test instrument for a visual inspection of an endface of a fiber optic connector and a power test of the optical fiber under test.

11 Claims, 6 Drawing Sheets

DUAL PURPOSE OPTICAL TEST INSTRUMENT

BACKGROUND

Technical Field

The present disclosure generally pertains to optical test instruments and evaluating optical communication links.

Description of the Related Art

Optical communication links, such as fiber optic cables, provide high speed transmission of data with relatively low loss. In view of this, optical communication links are often used in telecommunication networks, such as telephone lines, cable systems and the internet. In order to allow for adjustments to a network, such as adding, dropping, or moving optical cables in the network, or for coupling and decoupling to various transmitting and receiving equipment, each end of the fiber optic cables is held by a connector, such as a ceramic ferrule, a bulkhead adapter in a patch panel, etc., that allows for coupling and decoupling of the fiber optic cables. The connectors are designed to align endfaces of two fiber optic cables to be coupled, and to abut the endfaces of the optical fibers of the fiber optic cables in physical contact with each other. The connectors also allow the endfaces of the fiber optic cables to be aligned with optical inputs and outputs of various transmitting and receiving equipment.

Performance of the fiber optic cables is affected by the integrity of the fiber optic cables and the quality of the connection between abutting fibers or other optical connections. Prior to coupling, various tests may be performed on fiber optic cables to confirm that the cable satisfies appropriate standards. For instance, a power test may be conducted to evaluate the amount of power or power loss in a transmitted optical signal. Additionally, contamination between abutting optical fibers of two abutting fiber optic cables may block, diffuse, or misdirect the optical signal traveling from one optical fiber to another abutting optical fiber, thereby affecting the output signal. Thus, another test involves a visual inspection of endfaces of the fiber optic cables to confirm the cleanliness of the endfaces of the optical fibers of the fiber optic cables prior to coupling.

A visual inspection process typically involves a fiber optic inspection scope that illuminates an endface of optical fibers of a fiber optic cable and obtains images of the endface. The inspection process may include a comparison to endface goodness standards for the intended application of the fiber optic cable. Such standards may be set by the International Electrotechnical Commission (IEC) (e.g., IEC Standard 61300-3-35) or various other organizations that set forth objective requirements for optical communication links, including Telecommunications Industry Association (TIA), Technical Standard Board (TSB), International Organization for Standardization (ISO), and Institute of Electrical and Electronic Engineers (IEEE).

BRIEF SUMMARY

One or more embodiments disclosed herein are directed to optical test instruments, such as fiber optic inspection scopes and optical power meters, for testing optical communication links, such as fiber optic connectors. The optical test instruments include a single test port that is able to operate in two modes of operation. In a first mode of operation, the optical test instrument is configured to provide an image of the endface of a fiber optic connector under test. In a second mode of operation, the optical test instrument is configured to measure power or power loss in an optical fiber under test. In that regard, the fiber optic connector only has to be coupled to a single port of an optical test instrument for a visual inspection of an endface of a fiber optic connector and a power test of the optical fiber under test.

One embodiment is directed to an optical test instrument comprising a housing and a port configured to engage with a fiber optic connector of a fiber optic cable. The optical test instrument further includes an image sensor at an end of an optical path. The light received through the port into the housing travels along the optical path. The optical test instrument further includes an optical element positionable in the optical path to direct light along the optical path to the image sensor and an optical detector positionable in the optical path and configured to measure a parameter of the fiber optic cable. The parameter is indicative of a power or a power loss of an optical signal transmitted through the fiber optic cable. The optical test instrument further includes a movable mechanism. The optical element and the optical detector are mounted to the movable mechanism. The movable mechanism is configured to move the optical element and the optical detector between first and second positions. In the first position, the optical element is positioned in the optical path, while the optical detector is out of the optical path. In the second position, the optical detector positioned is in the optical path, while the optical element is out of the optical path.

Another embodiment is directed to an optical test instrument comprising a housing and a port configured to engage with a fiber optic connector of a fiber optic cable. The fiber optic cable has an endface. The optical test instrument further includes an image sensor configured to generate an image of the endface, an optical element configured to direct light to the image sensor, and an optical detector configured to receive light and convert the received light into one or more electrical signals. The optical test instrument is configured to operate in first and second modes of operation. In the first mode of operation, the optical test instrument operates as a visual inspection scope. In that regard, in the first mode of operation the optical element is positioned in an optical path in which light received through the port from the fiber optic connector travels, and directs light received through the port to the image sensor. In the second mode of operation, the optical test instrument operates as a power meter. In the second mode of operation the optical detector is positioned in the optical path to receive light received through the port.

Another embodiment is directed to a method that includes coupling a fiber optic connector to a port of an optical test instrument. The fiber optic connector reflects light through the port and into the optical test instrument along an optical path. After coupling the fiber optic connector to the port of the optical test instrument, the method further includes moving an objective lens from a first position that is out of the optical path to a second position that is in the optical path and obtaining an image of an endface of the fiber optic connector.

The method may further include moving the objective lens to the second position and moving an optical detector from a first position that is out of the optical path to a second position that is in the optical path. When the optical detector is in the second position that is in the optical path, the method include projecting light through an end of the fiber optic cable so that the light travels through the fiber optic cable to the fiber optic connector. The method further includes using the optical detector, receiving the light and measuring a parameter of the received light. The parameter is indicative of a power or a power loss of the light received.

DETAILED DESCRIPTION

Figure 1A:
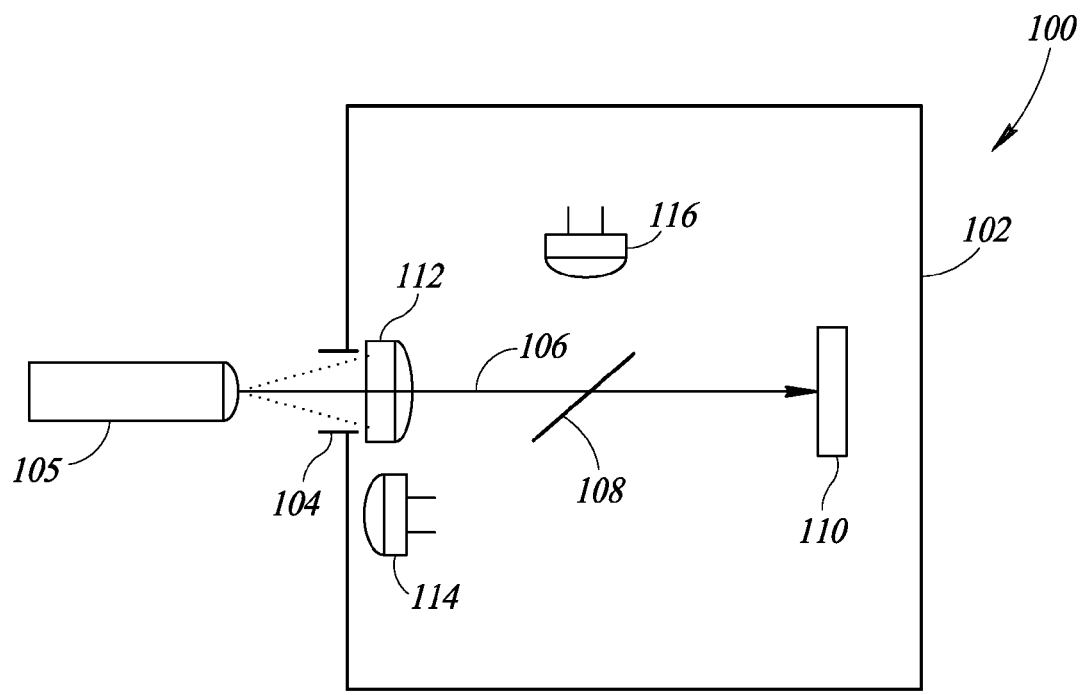
FIGS. 1A and 1B are schematic illustrations of an optical test instrument in different operating modes in accordance with one embodiment.
Figure 1B:
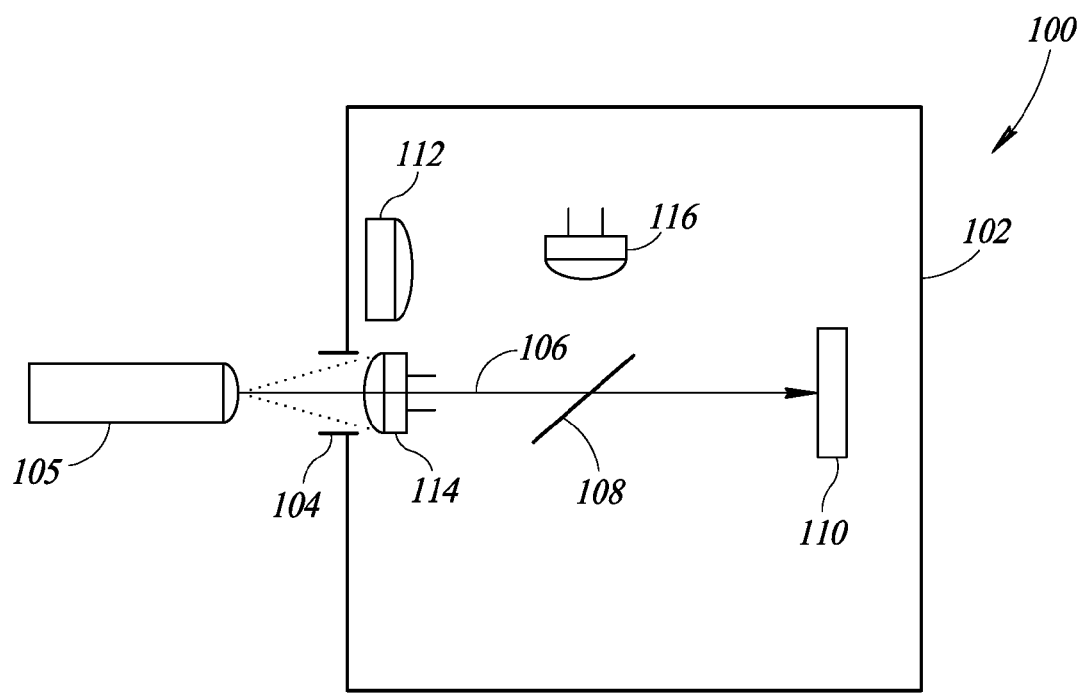

FIGS. 1A and 1B are schematic illustrations of an optical test instrument 100 in accordance with one embodiment. The optical test instrument 100 is configured to operate in first and second modes of operation. In a first mode of operation, the optical test instrument 100 is in a first configuration to visually inspect an endface of a fiber optic connector as shown in FIG. 1A. In a second mode of operation, the optical test instrument 100 is in a second configuration to measure power or power loss in a transmitted optical signal in the optical fiber cable under test. By operating in first and second modes of operation, a single optical test instrument may be used to perform both an optical power test and a visual inspection of the endface of a fiber optic connector under test.

The optical test instrument 100 has a housing 102 with a test port 104 that provides an optical path into and out of the housing 102. The test port 104 includes a connector coupling element (not shown) that is configured to couple with a fiber optic connector 105 to be tested. The fiber optic connector 105 includes a first end of a fiber optic cable to be tested. In particular, the first end of the fiber optic cable is held in the fiber optic connector 105 such that endfaces of the optical fibers are exposed. The connector coupling element may include a separable adaptor configured to couple with various types of fiber optic connectors.

Inside the housing 102 is an optical element, such as a beamsplitter 108, an image sensor 110, an objective lens 112, an optical detector 114, and an illumination source 116. The beamsplitter 108 and the image sensor 110 are located in the optical path 106. The optical detector 114 and the objective lens 112 are configured to move in and out of the optical path 106. In the first mode of operation as shown in FIG. 1A, the objective lens 112 is located in the optical path 106, while the optical detector 114 is out of the optical path 106. In the second mode of operation as shown in FIG. 1B, the optical detector 114 is located in the optical path 106, while the objective lens 112 is out of the optical path 106.

In the first mode of operation, the optical test instrument 100 has a first configuration in which the optical test instrument 100 operates as a visual inspection scope as shown in FIG. 1A. The illumination source 116, such as a light emitting diode (LED), is arranged in the housing 102 to project light to an endface of the fiber optic connector 105 under test. In one embodiment, the illumination device 116 emits light in the visible range, such as blue light having wavelengths between 450-495 nanometers. In particular, the illumination source 116 projects light to the beamsplitter 108, which directs light to the test port 104 and to the endface of the fiber optic connector 105 under test. Light directed to the fiber optic connector 105 reflects from the endface of the fiber optic connector 105 to the optical path 106 of the optical test instrument 100. The light reflected from the endface of the fiber optic connector 105 passes through the objective lens 112, which focuses the light onto the image sensor 110. In that regard, the image sensor 110 receives the light that passes through the objective lens 112. The image sensor 110 may be any device, such as an array of photodiodes, that receive the light and convert the light into electrical signals to generate an image. In one embodiment, the image sensor 110 is a visible light complementary metal-oxide-semiconductor (CMOS) or charge-coupled devices (CCD) sensor as is often used in video imaging devices but may also be Indium Gallium Arsenide (InGaAs) photodiodes or Germanium (Ge) photodiodes. The image sensor 110 may be able to obtain images that include both video and still images and provide them for display.

In the second mode of operation, the optical test instrument 100 has a second configuration in which it operates as an optical power meter as shown in FIG. 1B. In the second mode of operation, the objective lens 112 is moved out of the optical path 106 and the optical detector 114 is moved into the optical path 106. The optical detector 114 is configured to receive light emitted from the fiber optic connector 105 under test and convert the light to electrical signals. The optical detector 114 is any device configured to measure an output parameter of the fiber optic cable, such as power or power loss of the optical signal received from the fiber optic connector 105.

Generally described, in operation of the second configuration, a separate device directs an optical signal into a second, opposite end of the fiber optic cable under test so that the light of the optical signal is projected through the cable to the first end of the fiber optic connector 105. In particular, a light source (not shown) injects light into the second, opposite end of the fiber optic cable. Light that is transmitted through the fiber optic cable exits the first end of the fiber optic cable at the fiber optic connector 105 and is received by the optical detector 114 of the optical test instrument 100. As will be explained below, the optical detector 114 is coupled to optical power measurement circuitry that includes programmed logic operable to perform operations related to measuring an output parameter, such as power and/or power loss in the transmitted optical signal, and comparing the output parameter to a threshold value.

In order to move between the first and second modes of operation, the objective lens 112 and the optical detector 114 are configured to move in and out of the optical path 106. In one embodiment, the objective lens 112 and the optical detector 114 are coupled to a movable mechanism that moves both the objective lens 112 and the optical detector 114 simultaneously.

Figure 2A:
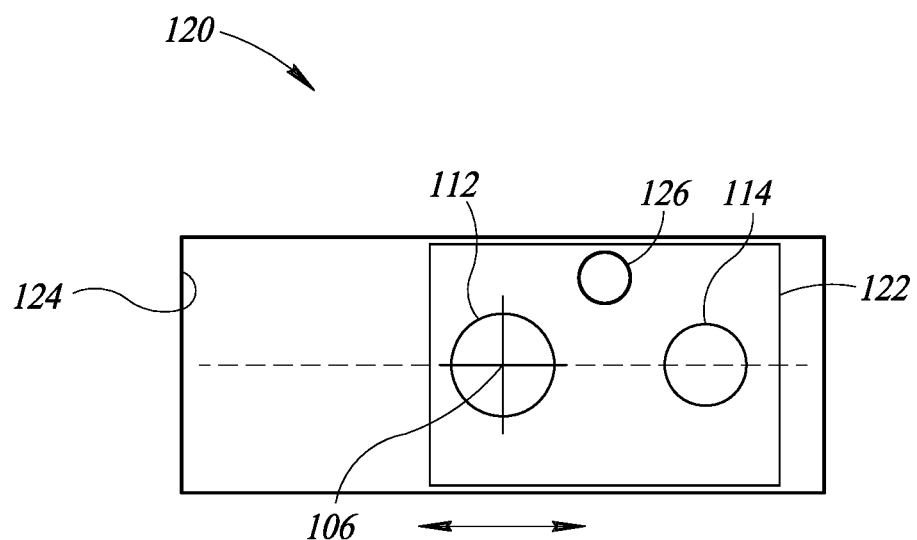
FIGS. 2A and 2B are schematic illustrations of a slide mechanism in different positions in accordance with one embodiment.
Figure 2B:
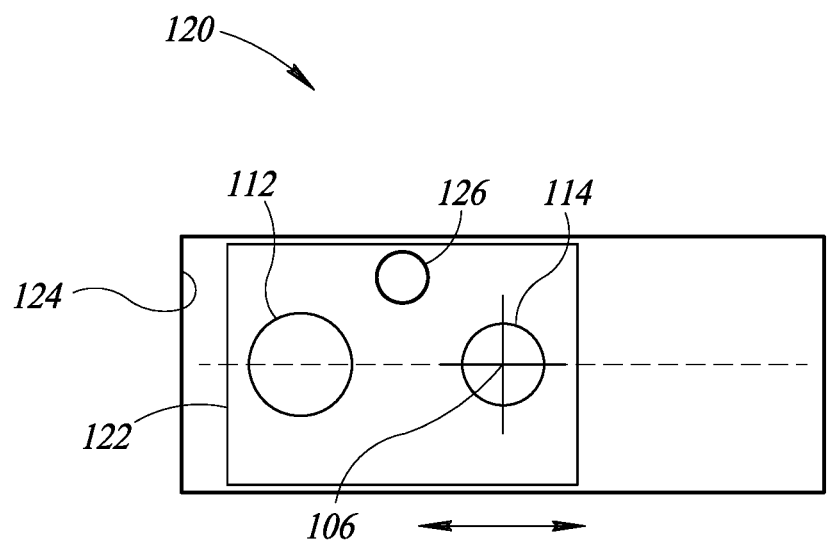

FIGS. 2A and 2B are schematic illustrations of a movable mechanism, which is a sliding mechanism 120, that moves the objective lens 112 and the optical detector 114 linearly in and out of the optical path 106, which is represented in FIGS. 2A and 2B as crosshairs. The sliding mechanism 120 includes a sliding element 122 that supports the objective lens 112 and the optical detector 114 inside the housing 102.

The sliding element 122 is movably coupled to the housing 102. The sliding element 122 may be located in a receiving portion 124 and slides linearly inside the receiving portion 124. In FIG. 2A, the sliding element 122 is in a first position at a right side of the receiving portion 124, which correlates to the first configuration of FIG. 1A in which the objective lens 112 is in the optical path 106 and the optical detector 114 is to the right of the optical path 106. In FIG. 2B, the sliding element 122 is in a second position at a left side of the receiving portion 124, which correlates to the second configuration of FIG. 1B in which the optical detector 114 is in the optical path 106 and the objective lens 112 is to the left of the optical path.

When the sliding element 122 slides from the first position of FIG. 2A to the second position of FIG. 2B, the sliding element 122 moves from the right side to left side such that the objective lens 112 moves out of the optical path 106 and the optical detector 116 moves into the optical path 106. Conversely, when the sliding mechanism 120 slides from the second position of FIG. 2B to the first position of FIG. 2A, the sliding element 122 moves to the right such that the optical detector 114 moves out of the optical path 106 and the objective lens 112 moves into the optical path 106. The sliding mechanism 120 may include an engagement element, such as a spring or a detente, that releasably holds the sliding element 122 in the first and second positions.

The sliding mechanism 120 may be moved by a mechanical mechanism or by an electro-mechanical mechanism. For instance, as shown in FIGS. 2A and 2B, the sliding mechanism 120 includes a knob or a lever 126 that extends from the housing 102 of the optical test instrument 100. In that regard, a user may be slide the lever to cause the sliding element 122 in the housing 102 to move the optical detector 114 and objective lens 112 in and out of the optical path 106. Alternatively, the sliding mechanism 120 is moved by an electromechanical mechanism, such as a piezoelectric element, that deforms in response to a change in voltage, which causes a mechanical component to move the sliding mechanism 120. A solenoid, a motor, or other electrically-driven mechanism may alternatively be used to move the sliding mechanism 120.

Figure 3A:
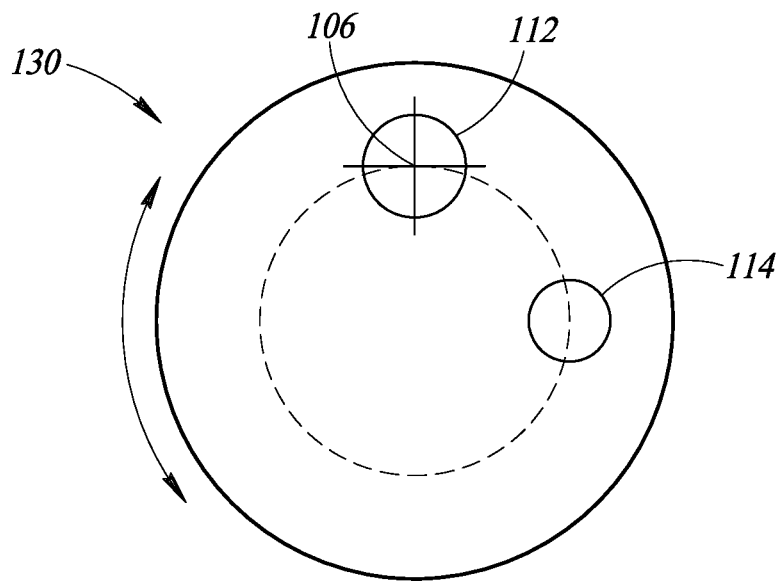
FIGS. 3A and 3B are schematic illustrations of a rotating mechanism in different positions in accordance with one embodiment.
Figure 3B:
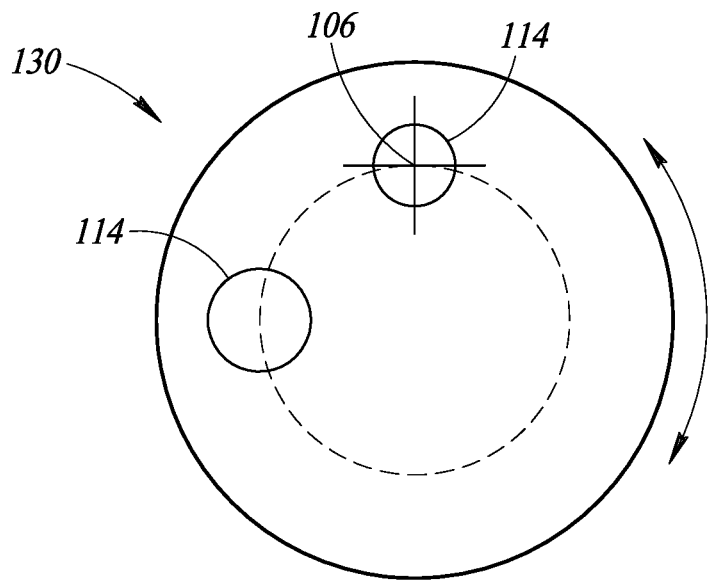

FIGS. 3A and 3B are schematic illustrations of a movable mechanism 130 according to another embodiment. The movable mechanism 130 of FIGS. 3A and 3B is a rotating mechanism 130 that rotates the objective lens 112 and the optical detector 114 between at least two positions to move them in and out of the optical path 106. The objective lens 112 and the optical detector 114 are mounted to the rotating mechanism 130. The rotating mechanism 130 rotates clockwise or counterclockwise to cause the objective lens 112 and the optical detector 114 to move circumferentially.

The first position of the objective lens 112 and the optical detector 114, shown in FIG. 3A, correlates to the first configuration of the optical test instrument 100 as shown in FIG. 1A, while the second position, shown in FIG. 3B, correlates to the second configuration, shown in FIG. 1B. In the first position shown in FIG. 3A, the objective lens 112 is in the optical path 106 and the optical detector 114 is at a 3:00 position. When the rotating mechanism 130 is rotated 90° in a counterclockwise direction from the first position of FIG. 3A to the second position of FIG. 3B, the objective lens 112 is rotated out of the optical path 106 to a 9:00 position, and the optical detector 114 is rotated into the optical path 106. Conversely, when the rotating mechanism 130 is rotated clockwise 90° from the second position of FIG. 3B to the first position of FIG. 3A, the optical detector 114 is rotated out of the optical path 106, and the objective lens 112 is rotated back into the optical path 106.

Similar to the sliding mechanism 120, the rotating mechanism 130 may be moved by a mechanical mechanism or by an electromechanical mechanism. For instance, in one embodiment an outer portion of the rotating mechanism 130 may extend from an outer surface of the housing 102. In that regard, a user may rotate the outer portion of the rotating mechanism 130 to move the optical detector 114 and objective lens 112 in and out of the optical path 106.

In FIGS. 3A and 3B, the rotating mechanism 130 rotates in a plane that is normal or at an angle to the optical path 106. In yet another alternative configuration, the rotating mechanism 130 may be oriented to have a plane of rotation that is parallel to the optical path 106. In this alternative configuration, the optical lens 112 and the optical detector 114 are oriented on the rotating mechanism so they are each correctly oriented in the optical path 106 when the rotating mechanism is moved to positions that alternatively place the optical lens 112 and the optical detector 114 in the optical path 106.

Figure 4A:
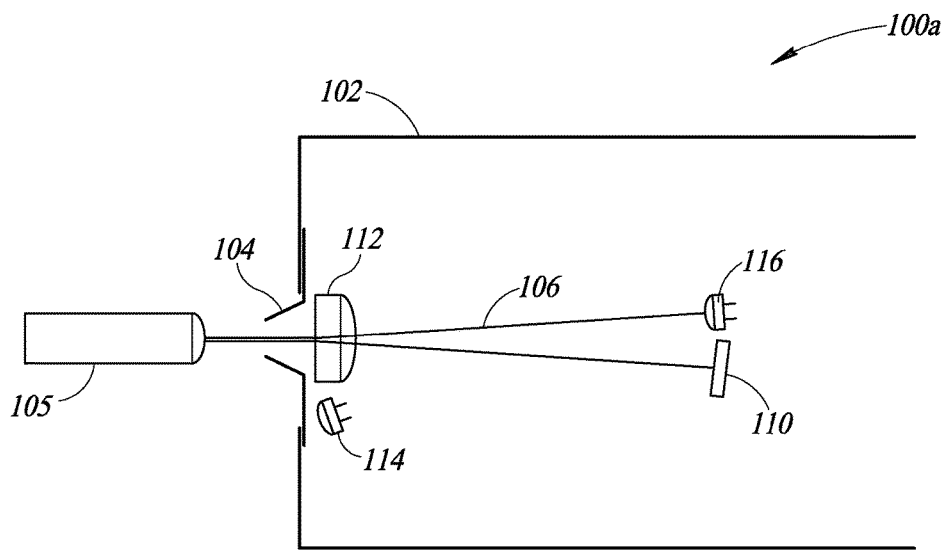
FIGS. 4A and 4B are schematic illustrations of an optical test instrument in different operating modes in accordance with another embodiment.
Figure 4B:
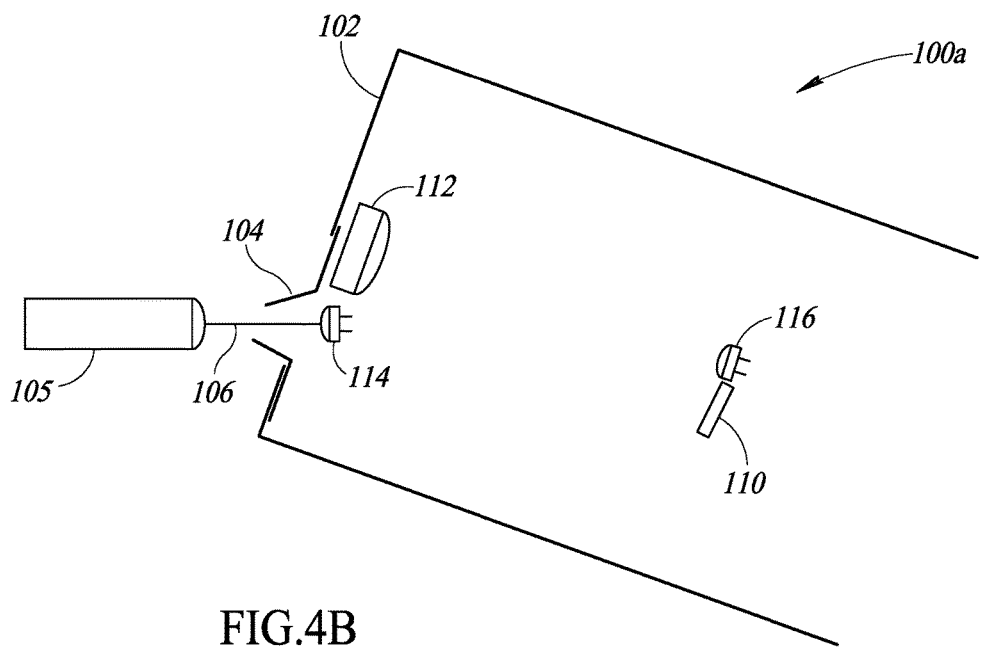

FIGS. 4A and 4B are schematic illustrations of an optical test instrument 100a in accordance with another embodiment. FIG. 4A illustrates the optical test instrument 100a in the first mode of operation in which the optical test instrument 100a is configured to operate as a visual inspection scope, while FIG. 4B illustrates the optical test instrument 100a in the second mode of operation in which the optical test instrument 100a is configured to operate as a power meter. The optical test instrument 100a of FIGS. 4A and 4B differs from the optical test instrument 100 of FIGS. 1A and 1B in that the housing 102 and the optical components in the housing 102 of the optical test instrument 100a of FIGS. 4A and 4B move relative to the test port. In that regard, the objective lens 112 and the optical detector 114 are moved in and out of the optical path 106 by the movement of the housing 102 relative to the port 104. Thus, when the housing 102 moves, the optical components within the housing 102 align with the port 104 so that the optical components within the housing 102 move in and out of the optical path 106 as will be explained in more detail below.

Another difference between the optical test instrument 100a of FIGS. 4A and 4B and the optical test instrument 100 of FIGS. 1A and 1B is that the illumination source 116 in the optical test instrument 100a is located in the housing 102 to project light to the port 104 without the use of an optical element, such as beamsplitter. Next to the illumination source 116 is the image sensor 110. The image sensor 110 is positioned to receive light reflected from the endface of the fiber optic connector 105.

With reference to FIG. 4A, the housing 102 is located in a first position. In the first position, the objective lens 112 is located in the optical path 106 and the image sensor 110 is positioned in the optical path 106 to receive light directed to it by the objective lens 112. In that regard, the optical test instrument is in the first configuration in which the optical test instrument 100a operates as a visual inspection scope as described above with respect to FIG. 1A. In particular, the illumination source 116 provides light to the endface of the fiber optic connector 105, which is reflected back to the objective lens 112. The objective lens directs the light to the image sensor 110.

The housing 102 of the optical test instrument 100a is rotated clockwise relative to the port from the first position of FIG. 4A to a second position shown in FIG. 4B. In the second position, the objective lens 112 is moved out of the optical path 106 and the optical detector 114 is moved into the optical path 106. Furthermore, when the housing 102 of the optical test instrument 100a is moved from the first position to the second position, the illumination source 116 and the image sensor 110 are moved as well. With the housing 102 in the second position as shown in FIG. 4B, the optical test instrument 100a is configured to operate as an optical power meter as described above with respect to FIG. 1B.

Figure 5A:
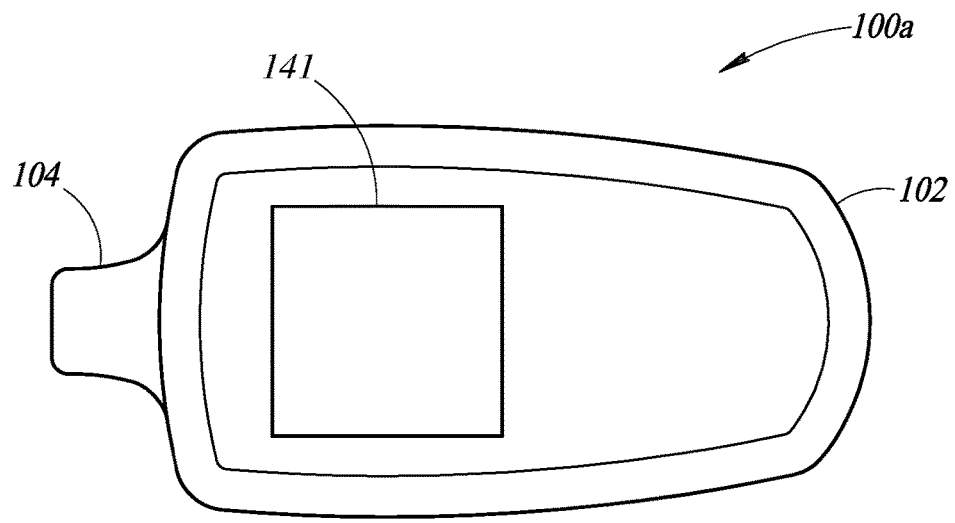
FIGS. 5A and 5B are plan views of the optical test instrument of FIGS. 4A and 4B.
Figure 5B:
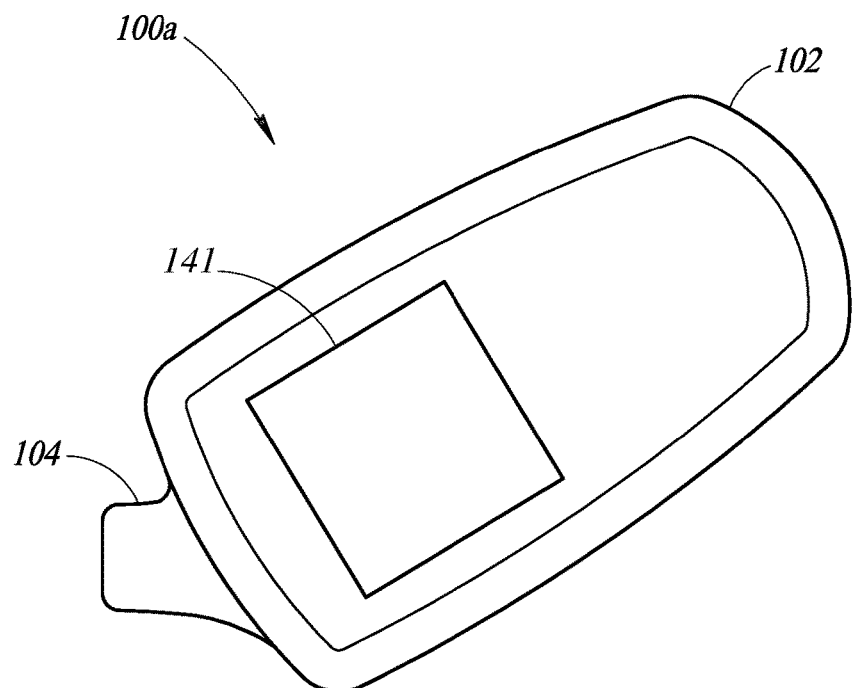

FIGS. 5A and 5B show a plan view of the optical test instrument 100a in the first position and the second position. The optical test instrument 100a includes a display 141 that is configured to display information obtained by the optical test instrument 100a, such as still images and videos of the endface of the fiber optic connector 105, or analysis data generated by the optical test instrument 100a.

Although FIGS. 5A and 5B show the housing 102 rotating sideways on a horizontally-oriented plane, it is to be appreciated that the housing 102 may rotate relative to the port 104 (or vice versa) a variety of ways. For instance, in another embodiment, the housing 102 may be configured to rotate up and down on a vertically-oriented plane, wherein the objective lens 112 and the optical detector 114 are moved into and out of the optical path 106 depending on the vertical positioning of the housing 102. Again, when the housing 102 of the optical test instrument 100a is moved vertically from a first position to a second position (or vice versa), the illumination source 116 and the image sensor 110 are moved as well. In yet an alternative embodiment, the port 104 and the connector coupling element are configured to move relative to the housing 102 to align the optical path 106 between the objective lens 112 and the optical detector 114.

Figure 6:
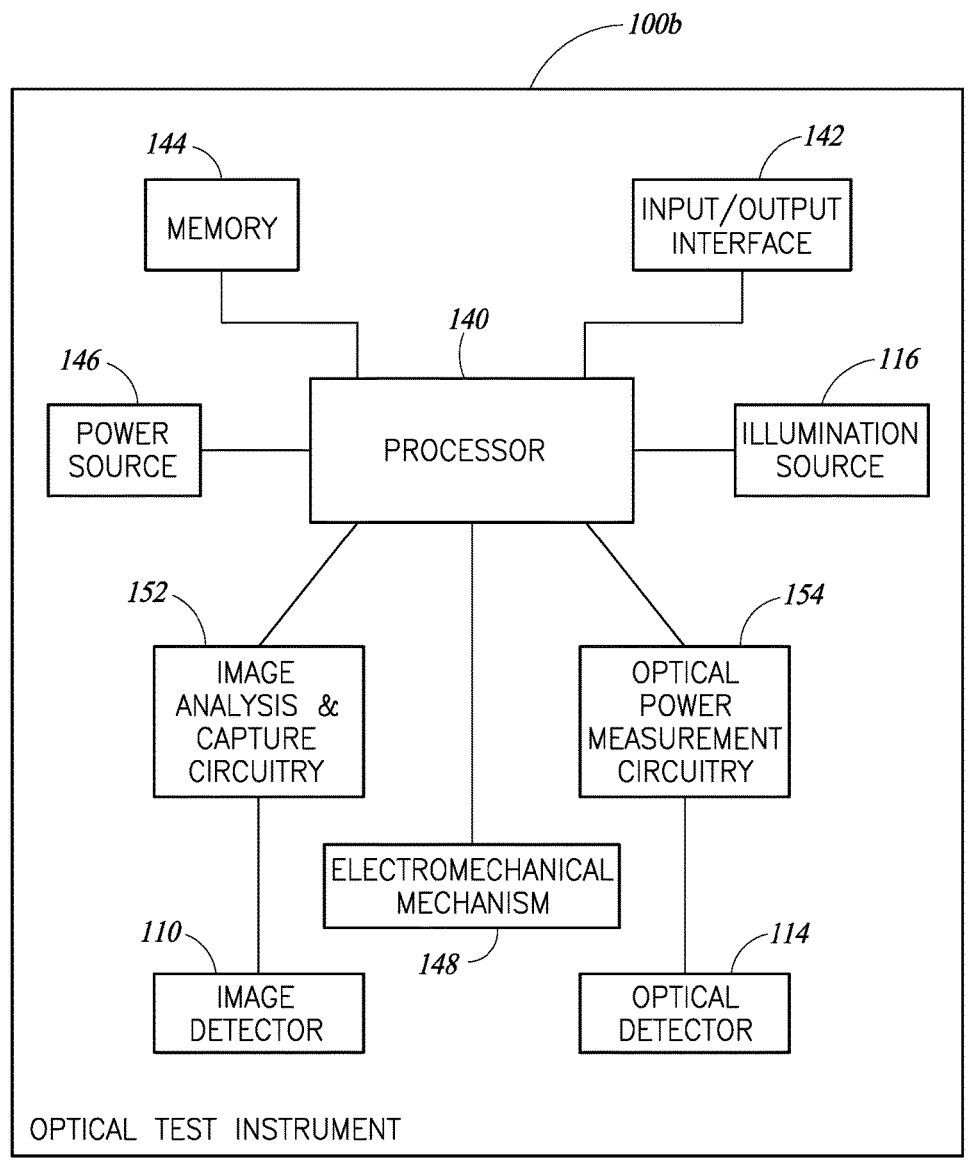
FIG. 6 is a block diagram of electrical components of the optical test instrument in accordance with one embodiment.

FIG. 6 is a block diagram illustrating electrical components of an optical test instrument 100b, which may also be the optical test instrument 100 of FIGS. 1A and 1B and the optical test instrument 100a of FIGS. 4A and 4B, in accordance with one embodiment. The optical test instrument 100b includes a processor 140 operably coupled to an input/out interface 142, a memory 144, the optical detector 114, the image sensor 110, the illumination source 116, a power source 146, and an electromechanical mechanism 148. The processor 140 is also coupled to image analysis and capture circuitry 148 and optical power measurement circuitry 154. In some embodiments, however, the image analysis and capture circuitry 148 and optical power measurement circuitry 154 are integrated in the processor 140.

Generally described, the processor 140 controls the operation of the optical test instrument 100b. The memory 144 contains executable instructions that cause the processor 140 and image analysis and capture circuitry 148 to carry out a visual inspection test of an endface of the fiber optic connector 105 under test.

In operation of a visual inspection test, the processor includes suitable circuitry and programming logic operable to cause the electromechanical mechanism 148 to move the objective lens 112 into the optical path 106 and to activate and deactivate the illumination source. In one embodiment, the electromechanical mechanism 148 is a piezoelectric element that expands and contracts in response to changes in voltage, which causes the movable mechanism 120, 130 coupled to the objective lens 112 and the optical detector 114 to move between first and second positions.

The image analysis and capture circuitry 152 includes suitable circuitry and programming logic operable to activate and deactivate the image sensor 110 for obtaining imaging data of the endface of the fiber optic connector 105 under test. The image analysis and capture circuitry 152 includes suitable programming logic to receive the imaging data from the image sensor 110 and to analyze the imaging data received, such as to compare the image to a stored image. The image analysis and capture circuitry 152 may provide the imaging data to the processor 140, which may store the imaging data in the memory 144 or cause images of the endface to be displayed on a display of the input/output interface 142. The display may also display information related to the analysis of the endface by the image analysis and capture circuitry 152.

The memory 144 also contains executable instructions that cause the processor 140 and the optical power measurement circuitry 154 to carry out a power test of the fiber optic connector 105 under test. During the power test, the optical detector 114 is moved into the optical path 106 by the electromechanical mechanism 148. The optical power measurement circuitry 154 includes suitable circuitry and programming logic to perform operations related to measuring an output parameter, such as power and/or power loss, of an optical signal transmitted through the optical fiber coupled to the fiber optic connector 105 and comparing the output parameter to a threshold value. The optical power measurement circuitry 154 may provide output parameters, such as power values, to the processor 140, which may store the values in memory 144 or cause the values to be displayed on a display of the input/output interface 142.

Besides a display, the user interface 142 may include a keyboard, knobs, and buttons that allow a user to interact with various components, such as the processor 140, the image analysis and capture circuitry 152, the optical power measurement circuitry 154, and the electromechanical mechanism 148 to cause one or more of them to operate the optical test instrument 100b as a visual inspection scope or a power meter as discussed above. The power source 146, which can be a battery or a plug for coupling to a main power supply, provides power for operating the optical test instrument 100b.

The various embodiments described above can be combined to provide further embodiments. For instance, the optical test instrument 100a may include a beamsplitter 108 with the illumination source 116 as described in reference to the optical test instrument 100. Conversely, the optical test instrument 100 may not include the beamsplitter 108.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical test instrument comprising:
a housing;
a port configured to engage with a fiber optic connector of a fiber optic cable;
an image sensor at an end of an optical path, wherein light received through the port into the housing travels along the optical path;
an optical element positionable in the optical path to direct light along the optical path to the image sensor;
an optical detector positionable in the optical path and configured to measure a parameter of the fiber optic cable, wherein the parameter is indicative of a power or a power loss of an optical signal transmitted through the fiber optic cable; and
a movable mechanism, wherein the optical element and the optical detector are mounted to the movable mechanism and the movable mechanism is configured to move the optical element and the optical detector between first and second positions, wherein in the first position, the optical element is positioned in the optical path, while the optical detector is out of the optical path, and wherein in the second position, the optical detector positioned is in the optical path, while the optical element is out of the optical path.

2. The optical test instrument of claim 1, wherein the movable mechanism is a sliding mechanism that linearly slides the optical element and the optical detector between the first and second positions.

3. The optical test instrument of claim 1, wherein the movable mechanism is a rotating mechanism that rotates the optical element and the optical detector between the first and second positions.

4. The optical test instrument of claim 1, wherein the movable mechanism is mechanically actuated, and wherein the movable mechanism includes a portion at an outer surface of the housing that, when moved, causes the movable mechanism to move between the first and second positions.

5. The optical test instrument of claim 1, wherein the movable mechanism is electromechanically actuated.

6. The optical test instrument of claim 1, wherein in the first position, the optical test instrument is configured to operate as a visual inspection scope configured to generate an image of an endface of the fiber optic connector.

7. The optical test instrument of claim 1, wherein in the second position, the optical test instrument is configured to operate as a power meter.

8. An optical test instrument comprising:
a housing including a port configured to engage with a fiber optic connector of a fiber optic cable, the fiber optic cable having an endface;

an image sensor in the housing and at an end of an optical path, wherein the image sensor is configured to generate an image of the endface;

an optical element in the housing, wherein the optical element, when positioned in the optical path, is configured to direct light to the image sensor;

an optical detector in the housing, wherein the optical detector, when positioned in the optical path, is configured to receive light and convert the received light into one or more electrical signals indicative of power; and a movable mechanism in the housing and configured to move between first and second positions, wherein the optical element and the optical detector are mounted to the movable mechanism and configured to move between the first and second positions, wherein the optical test instrument is configured to operate as a visual inspection scope when the movable mechanism is in the first position and configured to operate as a power meter when the movable mechanism is in the second position.

9. The optical test instrument of claim 8, wherein the movable mechanism is a rotating mechanism that rotates the optical element and optical detector between the first and second positions.

10. The optical test instrument of claim 8, wherein the movable mechanism is a sliding mechanism that linearly slides the optical element and the optical detector between the first and second positions.

11. The optical test instrument of claim 8, further comprising a piezoelectric element that expands and contracts in response to changes in voltage, wherein the piezoelectric element is configured to cause the movable mechanism to move between the first and second positions.

* * * * *